April 7, 1936.                     T. W. MURPHY                     2,036,489
              LIQUID STRAINER AND PRESSURE REGULATING UNIT
                   Filed Oct. 17, 1934        4 Sheets-Sheet 1

INVENTOR.
Thomas W. Murphy,
BY
ATTORNEY.

April 7, 1936.  T. W. MURPHY  2,036,489
LIQUID STRAINER AND PRESSURE REGULATING UNIT
Filed Oct. 17, 1934  4 Sheets-Sheet 2
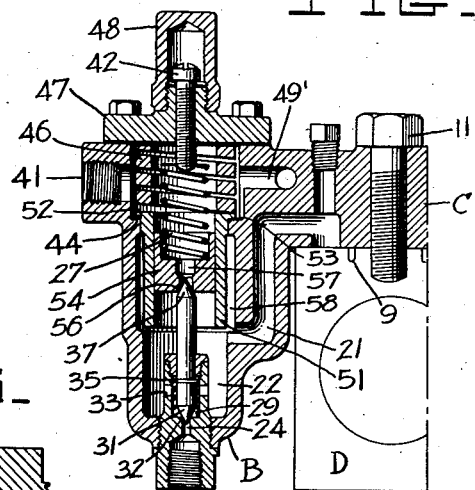
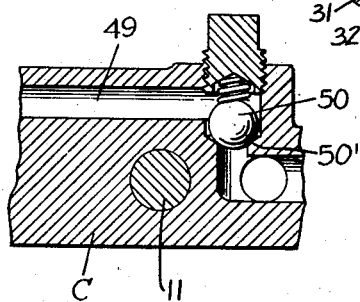
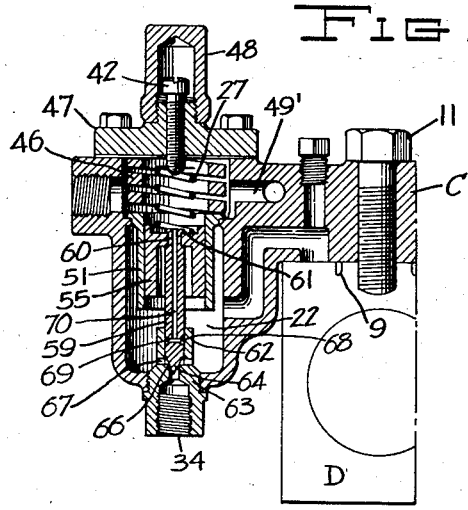
INVENTOR.
Thomas W. Murphy,
BY
ATTORNEY.

April 7, 1936.　　　T. W. MURPHY　　　2,036,489
LIQUID STRAINER AND PRESSURE REGULATING UNIT
Filed Oct. 17, 1934　　　4 Sheets-Sheet 3
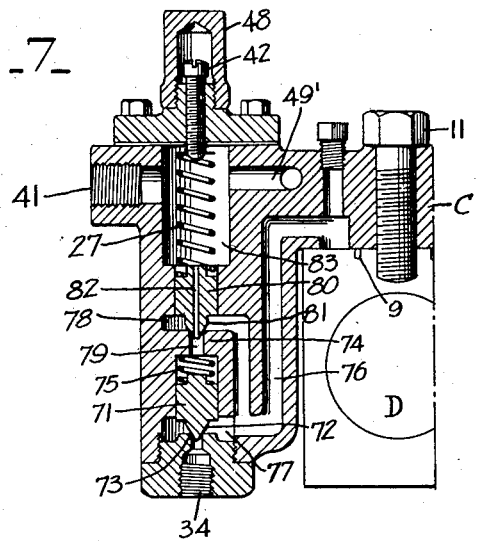
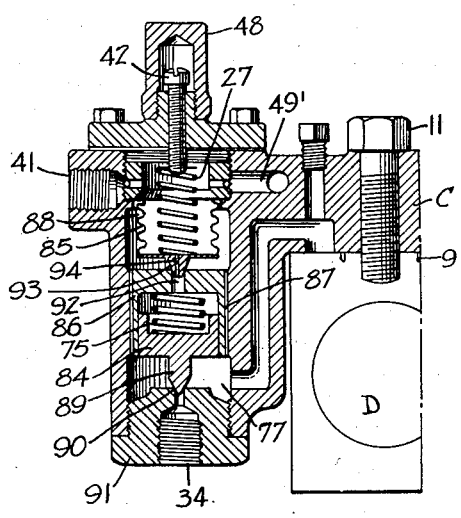
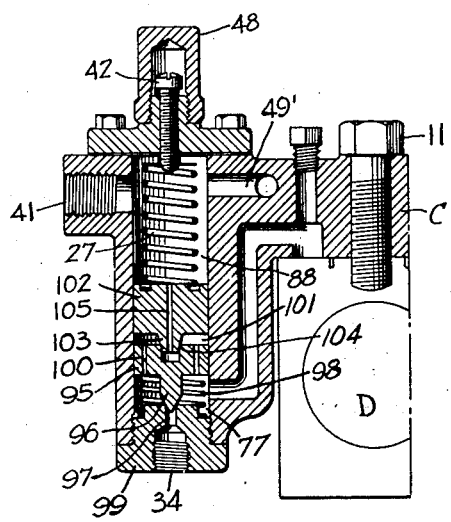
INVENTOR.
Thomas W. Murphy,
BY
ATTORNEY.

April 7, 1936.  T. W. MURPHY  2,036,489
LIQUID STRAINER AND PRESSURE REGULATING UNIT
Filed Oct. 17, 1934   4 Sheets-Sheet 4
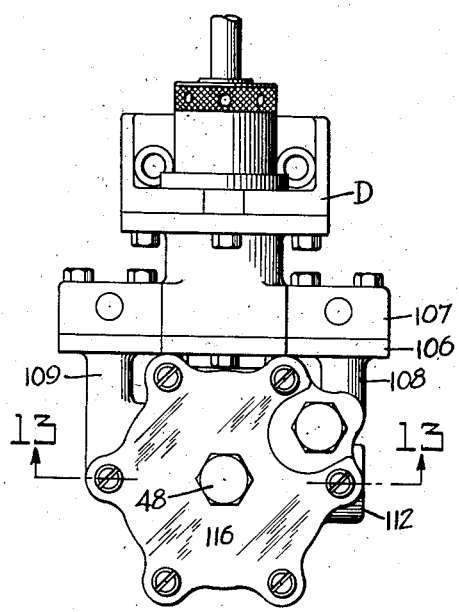
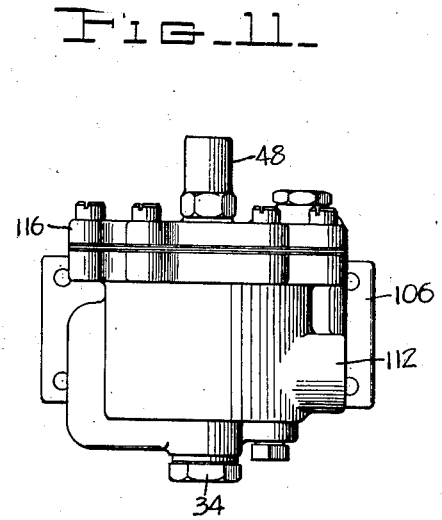
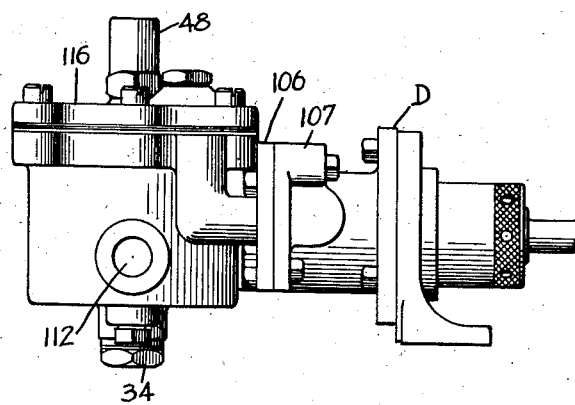
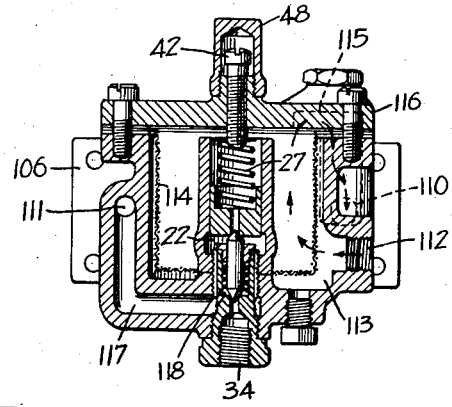
INVENTOR.
Thomas W. Murphy,
BY
ATTORNEY.

Patented Apr. 7, 1936

2,036,489

UNITED STATES PATENT OFFICE 2,036,489

LIQUID STRAINER AND PRESSURE REGULATING UNIT

Thomas W. Murphy, Bala-Cynwyd, Pa., assignor to Monarch Manufacturing Works, Inc., Philadelphia, Pa., a corporation of Delaware Application October 17, 1934, Serial No. 748,642

4 Claims. (Cl. 103—42)

This invention relates to straining and pressure regulating devices, and more particularly, to units for interchangeable association with pressure means to enable liquid to be supplied at desired points under predetermined pressures.

The present invention has to do primarily with oil burning devices and will be explained in connection therewith, although limitations are not to be imposed thereby.

In the usual oil burning system, oil from a supply tank is passed through a strainer on the vacuum side of a pump and then from the pressure side of such pump through a regulating valve which supplies oil at predetermined and maintained pressure to the atomizer or burner nozzle. These parts are usually separate units, and are connected into the supply line in the order named, although the entire combination comprising pump, strainer and regulating valve has been, in at least one design, housed in a single casing. This has several objections, chief among them being that it is necessary to make different castings for every change in pump capacity, etc., and in case of mutilation or breakage of any of the parts of the casing, an entire new casing must be provided. Moreover, in case it is necessary to make certain repairs to the pump, the entire unit must be de-mounted.

The object of the present invention is to provide a combination of elements to obtain a working unit in which these objections are overcome.

Another object is to provide a unit which can be quickly and conveniently installed and in like manner disconnected for repair or replacement of any of the working parts.

Still another object is to provide a unit in which either a piston or diaphragm may be interchangeably used in a regulating valve without dismantling of the unit.

Still another object is to provide a mechanism adapted, without change, for use with pumps of different types and capacities.

According to the invention, the pumping and regulating unit comprises a strainer and a regulating valve associated for attachment to a pressure pump, and so arranged that liquid is drawn into the suction side of the pump through the strainer, and passed from the pressure side of said pump to the regulating valve where excess liquid is returned to the source. The unit is provided with the necessary passageways for combining the elements into a compact unit.

The drawings illustrate an embodiment of the invention and the views therein are as follows:

Fig. 4 is a like fragmentary view showing a different type of regulating valve.

Fig. 5 is a like fragmentary view showing still another type of regulating valve.

Fig. 6 is an enlarged detail section taken on the line 6—6 of Fig. 3.

Figs. 7, 8 and 9 show fragmentary views of a unit with other designs of regulating valves.

Fig. 10 is a plan view of another design of unit attached to a pump.

Fig. 11 is a front view of same.

Fig. 12 is a side view thereof.

Fig. 13 is a vertical sectional view on the line 13—13 of Fig. 10.

Figure 1:
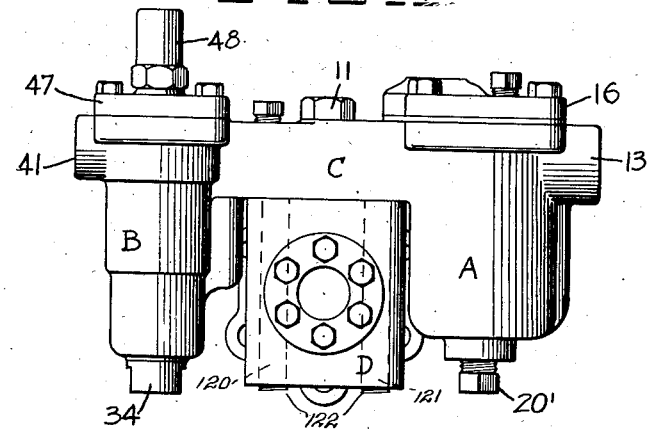
Fig. 1 is a side elevation showing a unit assembled with a pump.
Figure 2:
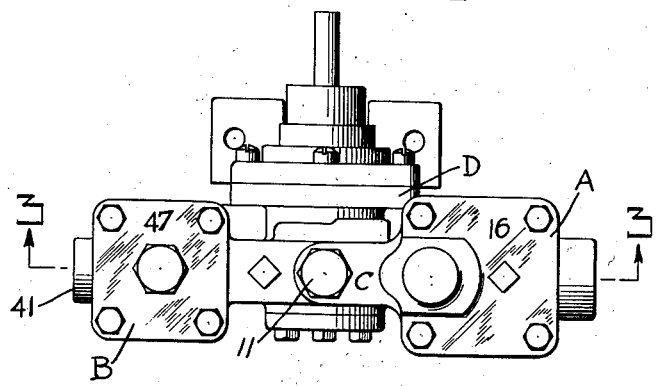
Fig. 2 is a plan view of same.

The unit shown in Figs. 1 to 5 inclusive broadly consists of a body 8, including a strainer A, and a regulating valve B, connected by a bridge C, which is adapted for mounting with a pump D.

The pump D may be of any desired type having a vacuum inlet and pressure outlet.

The unit shown in these figures straddles the pump, and the bridge C rests thereon. Suitable locating pins 9, in the bottom of the bridge fit into complimentary holes in the pump and prevent a side-wise movement of the unit, while a bolt 11, extending through the bridge, secures the unit to the pump, arranged to conform with the two-in-one unit passageways.

The strainer has an interior chamber 12, and an inlet 13, threaded for connection with a pipe leading to a source of liquid supply. This chamber is provided with a screen basket 14, through which the liquid must pass before being drawn into the pump. This basket is fastened in place between the body and the strainer cover 16, and suitable gaskets 17 are provided to prevent any leakage around the cover.

The cover has a passageway 18 communicating with the passageway 19 in the bridge, and the latter passageway communicates with the vacuum side of a pump D. The passageways receive strained liquid only. The strainer has an opening 20 in the bottom thereof, normally closed by a screw plug 20' for cleaning the sediment from the chamber 12.

No details of pump construction have been shown, as no particular type of pump is included as a part of the present invention, but any pump having the required capacity, etc., may be used.

The pump has passages 120 and 121 as shown in Fig. 1, so that it may be reversed, i. e., turned upside down, in which case the plugs 122 are inserted in the open ends of the passages.

Figure 3:
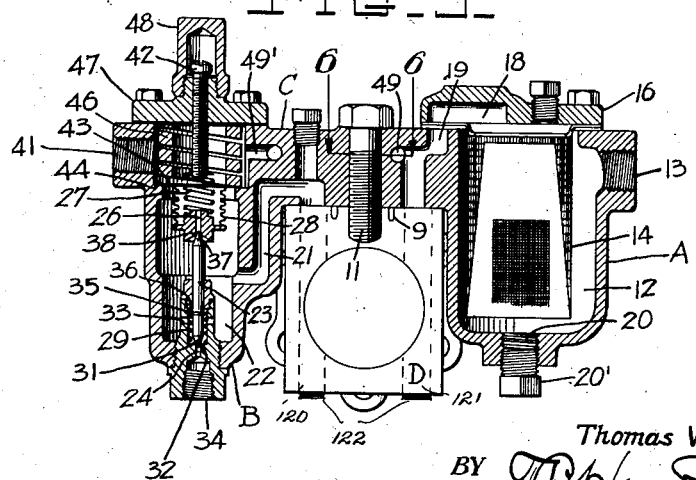
Fig. 3 is a vertical sectional view of the line 3—3 of Fig. 2.

The liquid from the pump D is forced under pressure through the goose-neck passageway 21, and enters the pressure chamber 22 of the valve. Fig. 3 shows a bellows diaphragm type of valve wherein a double-ended needle valve stem 23 controls both the burner port 24, and the excess by-pass port 26. This valve is so constructed and regulated by the spring 27 that when the pressure of liquid in the pressure chamber 22 reaches a predetermined figure (let us assume, 60 pounds) the tension of said spring will be overcome and the diaphragm 28 compressed. This permits the spring 29 to move the valve stem 23 upward so that the needle 31 will be withdrawn from the seat 32 and liquid will flow from the pressure chamber 22 through the openings 33 and then from the outlet 34. In oil burning systems this outlet leads directly to the atomizer or spray nozzle, commonly called the burner.

As pressure on the liquid in the pressure chamber 22 continues to rise, the diaphragm will be further collapsed or compressed, and since the valve stem 23 has a limiting collar 35 which strikes against the shoulder 36, the needle 37 can only follow this movement for a predetermined distance. Consequently, when this predetermined pressure is reached (let us assume, 100 pounds), the valve seat 38 in the bottom of the diaphragm clears the valve 37 and excess liquid flows through the passageway 26 and from the by-pass outlet 41 back to the source of supply.

Screw 42 regulates the tension on the spring 27, which can be adjusted to pass oil to the burner at any desired pressure and to by-pass the excess to the source of supply.

The diaphragm has an upper annular flange 43 resting on a shoulder 44, and this diaphragm is locked in place by a heavy spring 46, fitting between the diaphragm flange 43 and a valve cover 47. The head of the screw 42 is enclosed in a cap 48 to prevent accidental maladjustment and to prevent oil from escaping around the screw. This particular type of valve is illustrated and described in my co-pending application Serial No. 574,308, filed November 11, 1931.

If preferred, a permanent loop for the excess by-passed oil may be provided as shown in Fig. 6. A passageway 49 leads directly from the passageway 19 to an outlet 49' on the by-pass side of the diaphragm 28. A ball 50 may be disposed in a seat 50' when this permanent by-pass is not desired. It will, of course, be readily seen that with the use of the loop the by-passed liquid, which has been filtered, will be passed to the suction side of the pump and passed to the pressure chamber of the valve.

Fig. 4 illustrates another type of valve in the same casing as shown in Fig. 3. This is a piston type valve and is shown on a slightly enlarged scale.

A sleeve 51 has an annular flange 52 which rests on a gasket 53 on the shoulder 44 and said sleeve is in like manner secured in position by the spring 46.

In place of the diaphragm 28 this type of valve is provided with a piston 54 which operates in said sleeve, and the movement of this piston is controlled exactly the same as the diaphragm, to wit: by liquid pressure operating against the tension of the spring 27, which is regulated by the screw 42. This piston also has a seat 56 for the needle valve 37, and a passageway 57 for allowing the excess liquid to communicate with the by-pass outlet 41. With this type of valve, air will be entrapped and a cushion formed in the annular chamber 58, surrounding the said sleeve. Furthermore, while piston valves have always heretofore been recommended to be installed with burner port down, this type of valve may be installed in any horizontal or vertical position because there is little danger of locking the piston by dirt or sediment on account of the bore for said piston being spaced from the inner wall of the casing. This type of valve is illustrated and described in my co-pending application Serial No. 720,159, filed April 12, 1934.

Fig. 5 presents a different valve, although sleeve 51 is held in place by spring 46, and a piston is employed. The piston 55, however, carries a valve stem 59, which passes through a central opening 60 in said piston and is peened over at 61 in order to provide for some resiliency of action while still maintaining seepage proof connection. The valve stem extends down through a sleeve portion 62 formed integral with the seat member 63 and a needle valve 64 on the bottom thereof normally rests in a valve seat 66. The sleeve portion is provided with the usual openings 67 while the valve stem is provided with a tapered annular recess 68 having holes 69 extending across the vertex of said recess and communicating with a central passageway 70 which opens above the piston 55. This valve employs the regulating spring 27 and screw 42 as described in connection with Fig. 3.

When liquid under pressure is admitted to the pressure chamber 22, the piston 55 will move upward at the time a predetermined pressure is attained, and liquid will flow through the openings 67 and the burner outlet. As the pressure continues to increase the piston will continue to rise by overcoming the tension of the spring 27, and this will carry the valve stem 59 to a point where the top of the tapered annular recess is above the top of the sleeve portion 62, so that liquid will pass into the said recess, through the holes 69 and through the central passageway to the upper side of the piston 55, and thence through the by-pass outlet 41.

Of course the permanent loop shown in Fig. 6 may be utilized with this valve and also with the types shown in Figs. 7 to 9 inclusive.

The valve shown in Fig. 7 includes a lower piston 71, having a depending needle 72 normally resting in the seat 73. The valve body has an annular shoulder 74, and between this and the top of the said piston is a spiral spring 75. A passage 76 leading from the pressure side of the pump communicates with the pressure chamber 77 and also with the auxiliary chamber 78 above the shoulder 74, while a passage 79 leads from said chamber 78 to the space above the piston 71.

An upper piston 80 has a depending needle 81, normally closing the passage 79, while a central hole 82 extends from the apex of the needle through said piston and communicates with the chamber 83 from which the by-pass outlet 41 leads. The usual regulating spring 27 and screw 42 are employed in this valve.

When liquid under pressure is admitted to the pressure chamber 77 from the passageway 76, pressure is exerted against the bottom of the lower piston 71 so that upon the building up of said pressure to a predetermined figure, the tension of the spring 75 is overcome and said piston moves upward, opening the burner port 78. At the same time, pressure is being built up in the auxiliary chamber 78, but the tension of the spring 27 has been so set that it will not be overcome until the maximum operating pressure is attained. At such time, the upper piston 80 will rise, withdrawing the needle from the opening 79, and thus the liquid may pass through the hole 82 to the chamber 83 and from the excess by-pass port 41. Since the chamber 83 is always at or near atmospheric pressure no pressure can be built up on the upper side of the lower piston 76.

The valve shown in Fig. 8 employs a piston 84 and a bellows diaphragm 85. The valve body has a partition 86 which has passages 87 leading from the pressure chamber 77 to the chamber 88. This piston also has a depending needle 89 normally resting in the valve seat 90 in the seat member 91 for closing the burner port 34. The spiral spring 75 rests between the top of the piston and the bottom of the partition, while the partition is provided with a central opening 92 in which a needle 93 attached to the bottom of the diaphragm normally rests. The needle has a passage 94 extending through it and communicating with the chamber 88. The usual regulating spring 27 and screw 42 control the action of the diaphragm.

When pressure builds up under the piston 84 it overcomes the spring 75 and opens the burner port. At the same time, pressure has been built up on the diaphragm 85 but since the tension of the spring 27 has been so set, it requires a maximum operating pressure to raise the needle 93 from the opening 92 to permit liquid to by-pass through the passage 94 into chamber 88 and from by-pass outlet 41.

The valve illustrated in Fig. 9 employs a lower piston 95 having a depending needle 96, normally closing a passageway 97 leading to the burner port 34. This piston has a spiral spring 98 in the pressure chamber 77, which is normally pressed between the bottom of said piston and the seat member 99 as later explained. Extending through the piston are holes 100, which communicate with a space 101 between the top of said piston and the bottom of an upper piston 102. This latter piston has a depending valve member 103, normally fitting into a seat 104 in the top of the lower piston 95, while a passage 105 extends upward through the valve member 103 and piston 102 to communicate with the chamber 88 and by-pass opening 41. This valve also employs the regulating spring 27 and screw 42.

As the liquid under pressure enters the pressure chamber 77, a portion thereof passes up through the holes 100 into the space 101 and builds up an equalizing pressure on each side of the lower piston 95. When this pressure exerted against the bottom of the upper piston is sufficient to overcome the tension of the spring 27 the upper piston will rise and the tension of the spiral spring 98 will force the lower piston with it even though the liquid pressure on each side thereof is equal. As the pressure continues to increase the pistons will both rise together, holding valve member 103 in the seat 104 until the tension on spring 98 is exhausted, whereupon the equalized pressure will hold the lower piston at the extended end of spring 98 while the upper piston 102 will continue to rise withdrawing valve member 103 from its seat and thus permitting liquid to by-pass through the passage 105 to chamber 88 and through the outlet 41.

The openings of passages 19 and 21 are so arranged with respect to the vacuum and pressure passages of the pump that the unit may be mounted as shown in the drawings, or it may be mounted in any one of three other positions, viz. the strainer may be at the left hand side of the pump, which will provide the proper mounting in case the pump rotates in a direction contrary to that assumed with relation to the drawings; or in case of a rotation like that last mentioned and where it is desired to keep the strainer and regulating valve on the sides shown in the drawings, the pump itself may be turned upside down so that the passages 19 and 21 will communicate with passages 120 and 121 respectively, and the plugs 122 may then be changed from the position shown in Fig. 1 to the opposite or bottom side of the pump.

Figs. 10 to 13 illustrate a two-in-one unit of the type described and adapted for mounting on a front flange pump. This unit has a flange 106 for engaging and being fastened to the flange 107 of the pump. The unit has arms 108 and 109 respectively, which contain passageways 110 and 111 respectively, for aligning with the pump suction inlet and pressure outlet.

The unit has an inlet 112 leading into an annular strainer chamber 113 and a strainer basket 114 filters the liquid as it is drawn therethrough by the suction of the pump. The interior of this basket communicates with a passage 115 in the unit cover 116, and thence to the passageway 110 leading to the vacuum side of the pump as before stated and as shown by the arrows. When the liquid is discharged from the pump under pressure into the passageway 111 it passes through passage 117 and then through vertical slots 118 to pressure chamber 22 of a valve similar to that shown in Fig. 4, but with the sleeve 51 and heavy square spring 46 omitted. The valve operates like the valve of Fig. 4, but its casing is open at the top to permit by-passed liquid to be drawn therefrom and into passage 115, for return to the pump.

While the unit herein illustrated has been described as taking certain forms it will be understood, of course, that various modifications and changes may be made without departing from the invention herein set forth and hereafter claimed.

The invention is hereby claimed as follows:

1. In a liquid supply unit for oil burners, the combination of a demountable pump having two opposed faces, an inlet port and an outlet port for each face, a bridge integrally connecting a strainer chamber housing and a valve chamber casing and having an attaching face adapted to contact one of the faces of the pump, said strainer casing provided with an inlet port adapted to be connected with a source of liquid fuel supply and an outlet opening into the bridge face and forming communication with the suction side of said pump, a strainer unit in said strainer chamber interposed between the inlet port and outlet passage of said chamber, said pump having an outlet port communicating through a passage in said bridge face with the valve chamber, said valve chamber having a burner outlet port and a by-pass port, pressure responsive means in said valve chamber subject to the pressure of the liquid fuel supplied from the pump outlet port for controlling said ports, whereby the by-pass outlet port is adapted to discharge from said valve chamber any excess of liquid fuel over and above that discharged by the burner outlet port, means for variably and selectively connecting said pump to said bridge whereby the burner outlet port may be located on either side of said pump regardless of the direction of rotation of said pump, and means for plugging the pump ports on the face not attached to the bridge.

2. In a liquid fuel supply unit for oil burners, the combination of a demountable pump having two opposed faces, an inlet port and an outlet port for each face, substantially cylindrical casings containing respectively strainer means and valve means, a bridge integrally connecting said casings and having an attaching face adapted to contact one of the faces of the pump, said strainer casing provided with an inlet port adapted to be connected with a source of liquid fuel supply and an outlet opening into the bridge face and forming communication with the suction side of the pump, said pump having an outlet port communicating through a passage in said bridge face with the valve chamber, said valve chamber having a burner outlet port and a by-pass port, means for variably and selectively connecting said pump to said bridge whereby the burner outlet port may be located on either side of said pump regardless of the direction of rotation of said pump, and means for plugging the pump ports on the face not attached to the bridge.

3. In a liquid fuel supply unit for oil burners, the combination of a demountable pump having two opposed faces, an inlet port and an outlet port for each face, substantially cylindrical casings containing respectively strainer means and valve means, a bridge integrally connecting said casings and having an attaching face adapted to contact one of the faces of the pump, said strainer casing provided with an inlet port adapted to be connected with a source of liquid fuel supply and an outlet opening into the bridge face and forming communication with the suction side of the pump, said pump having an outlet port communicating through a passage in said bridge face with the valve chamber, said valve chamber having a burner outlet port and a by-pass port, a bolt extending through said bridge and into said pump for variably and selectively connecting said pump to said bridge whereby the burner outlet port may be located on either side of said pump regardless of the direction of rotation of said pump, and means for plugging the pump ports on the face not attached to the bridge.

4. In a liquid fuel supply unit for oil burners, the combination of a demountable pump having two opposed faces, an inlet port and an outlet port for each face, substantially cylindrical casings containing respectively strainer means and valve means, a bridge integrally connecting said casings and having an attaching face adapted to contact one of the faces of the pump, said strainer casing provided with an inlet port adapted to be connected with a source of liquid fuel supply and an outlet opening into the bridge face and forming communication with the suction side of the pump, said pump having an outlet port communicating through a passage in said bridge face with the valve chamber, said valve chamber having a burner outlet port and a by-pass port, a bolt extending through said bridge and into said pump for variably and selectively connecting said pump to said bridge whereby the burner outlet port may be located on either side of said pump regardless of the direction of rotation of said pump, means for preventing relative movement between said pump casing and bridge, and means for plugging the pump ports on the face not attached to the bridge.

THOMAS W. MURPHY.